US012728504B2

(12) United States Patent
Yan

(10) Patent No.: US 12,728,504 B2
(45) Date of Patent: Sep. 8, 2026

(54) SELF-LOCKING AND ADJUSTABLE DUAL RATCHET CLAMPING APPARATUS

(71) Applicant: Geng Yan, Calgary (CA)

(72) Inventor: Geng Yan, Calgary (CA)

( * ) Notice: Subject to any disclaimer, the term of this patent is extended or adjusted under 35 U.S.C. 154(b) by 341 days.

(21) Appl. No.: 18/502,010

(22) Filed: Nov. 4, 2023

(65) Prior Publication Data

US 2024/0198491 A1 Jun. 20, 2024

Related U.S. Application Data

(60) Provisional application No. 63/433,170, filed on Dec. 16, 2022.

(51) Int. Cl.
*B25B 5/08* (2006.01)
*B25B 5/16* (2006.01)

(52) U.S. Cl.
CPC .............. *B25B 5/085* (2013.01); *B25B 5/163* (2013.01); *B25B 5/166* (2013.01)

(58) Field of Classification Search
CPC ....... B25B 13/46; B25B 13/466; B25B 5/085; B25B 5/163; B25B 5/166; B25B 13/10; B25B 13/14; B25B 13/465
See application file for complete search history.

(56) References Cited

U.S. PATENT DOCUMENTS 2,905,038 A * 9/1959 Paden ..................... B25B 7/123 81/391
3,427,016 A * 2/1969 Harris ..................... B25B 5/068 269/215
6,748,826 B2 * 6/2004 Marks ..................... B25B 13/14 81/169
8,056,446 B1 * 11/2011 Wheeler ................... B25B 7/12 81/358
2006/0043660 A1 * 3/2006 Ping ........................ B25B 5/166 269/6

* cited by examiner

*Primary Examiner* — Jason L Vaughan

(57) ABSTRACT

The self-locking and adjustable dual ratchet clamping apparatus comprises a frame which is either a single rail or a dual rail structure having an integral ratchet rack on a side, a fixed jaw at one end of the frame, a movable jaw mounted on the frame and moves along the rail structure relative to the fixed jaw, a first ratchet system including a rotatable ratchet trigger pivotally connected to the movable jaw and is engaged with a locking pawl supported by the movable jaw to form a directional self-locking mechanism, a second ratchet system including a driving pawl engaged with the ratchet rack to form another directional self-locking mechanism, and a cascading mechanism connecting the first and second ratchet systems whereby the rotation of the rotatable ratchet trigger drives the movement of the driving pawl thereby translated into the movable jaw movement relative to the fixed jaw.

9 Claims, 12 Drawing Sheets

Section AB

SELF-LOCKING AND ADJUSTABLE DUAL RATCHET CLAMPING APPARATUS

REFERENCE TO RELATED APPLICATIONS

This application claims the benefit of U.S. Provisional Application No. 63/433,170, filed on Dec. 16, 2022.

FIELD OF THE INVENTION

The present invention relates to a self-locking and adjustable dual ratchet clamping apparatus that utilizes a cascading dual ratchet system to provide adjustable clamping gap, clamping force and self-locking function for applications such as plumbing wrench, wood clamp, jar opener and many others. The present invention offers easy and convenient operation on a wide range of the underlining workpieces the apparatus is operated on, such as plumbing connectors, lumbers, jar lids, etc., and also provides convenient clamping force adjustment and self-locking function.

BACKGROUND OF THE INVENTION

In many clamping applications such as plumbing wrench, mechanical wrench, wood clamp, jar opener and many others, the apparatus is required to have a variable clamping gap that can be quickly adjusted to adapt to a wide range of sizes of the underlining workpieces it is operated on, such as the plumbing connector diameters, bolt/nut diameters, lumber widths, jar lid diameters, etc. In many cases the apparatus is also required to provide clamping force on the underlining workpiece, so that the underlining workpiece can be firmly locked in a position, such as in the wood clamp application; or the apparatus can be firmly clamped onto the workpiece so that it will not easily detach from the workpiece and torque can be applied with ease of control, such as in the plumbing wrench, jar opener, and mechanical wrench applications. This creates the needs for a clamping apparatus that can provide a quick clamping gap and force adjustment, as well as a self-locking mechanism so that a user does not have to keep applying clamping force or maintaining the gap when in operation. The self-locking mechanism is especially beneficial to a wide range of users who either have weak hand grip due to old age or illnesses such as arthritis, or do not have the dexterity to coordinate applying proper clamping force while operating the apparatus.

While there are many devices exist in prior art and commercially available tools for these applications, there is no such a force-adjustable, self-locking and cascading dual ratchet mechanism implemented to achieve aforementioned convenient operations.

Therefore, there is a strong need for this invention to provide quick adjustable clamping gap and clamping force, and a self-locking mechanism to improve existing tools and provide easier and more convenient operations.

SUMMARY OF THE INVENTION

The primary object of the present invention is to provide a cascading dual ratchet mechanism that can offer quick clamping gap and force adjustment and self-locking function via the cascading pawl and ratchet engagements.

The second object is to provide a single rail system to implement said cascading dual ratchet mechanism so that a pair of opposing clamping ends have a variable gap along the single rail.

The other object is to provide a dual rail system to implement said cascading dual ratchet mechanism so that a pair of opposing clamping ends have a variable gap along the dual rail.

To the accomplishment of the above and related objects, this invention may be embodied in the preferred embodiments illustrated in the accompanying drawings. It should be noted however, that the drawings are illustrative only, and that various modifications can be made to achieve the same objectives.

BRIEF DESCRIPTION OF DRAWINGS

Various other objects, features and advantages of the present invention will become fully appreciated and better understood when considered in conjunction with the accompanying drawings, wherein for the preferred embodiments.

DETAILED DESCRIPTION OF THE INVENTION

Figure 1:
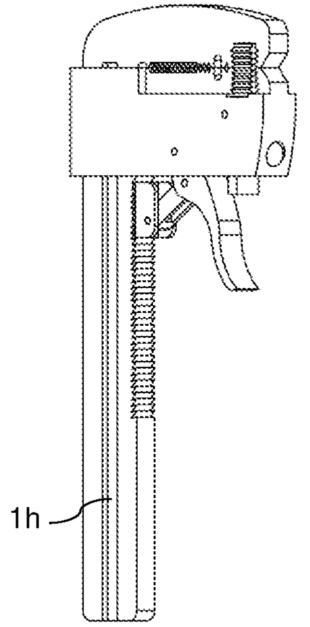
FIG. 1 is a perspective view of a preferred embodiment of a single rail self-locking and adjustable dual ratchet clamping apparatus (referred to as single rail clamping apparatus hereon) in the application as a plumbing wrench.

Although specific embodiments of the present invention have been described for purposes of illustration, a person skilled in the art will recognize that numerous variations, modifications, and alternative implementations are possible without departing from the spirit and scope of the invention. Accordingly, the invention is not limited to the disclosed embodiments, and all such variations, modifications, and equivalents are intended to be included within the scope of the invention as defined by the claims. As used herein, the terms "having," "containing," "comprising," "including," "consisting," and grammatical variants thereof are intended to be open-ended, indicating that the listed elements are not exhaustive and that additional elements may be present.

In the disclosure the same reference characters represent the same elements in all figures. The references of "up", "down", "upper", "lower", "top", "bottom", "vertical", "horizontal", "front", "rear" and so on are based on the positions shown on the views. Terms like "first", "second", "third", "forth", "last", "one", "another", "on one end", "on the other end" and so on are used to arbitrarily distinguish the elements in relation to the position and/or the sequence of a description or illustration. On the figures with a combination of orthographic, sectional and perspective views, the reference characters may not be indicated to avoid reducing legibility of the drawing details, however the components will become obvious on the other views.

FIG. 1 illustrates a single rail clamping apparatus in its uppermost position in a preferred embodiment as a plumbing wrench.

Figure 2:
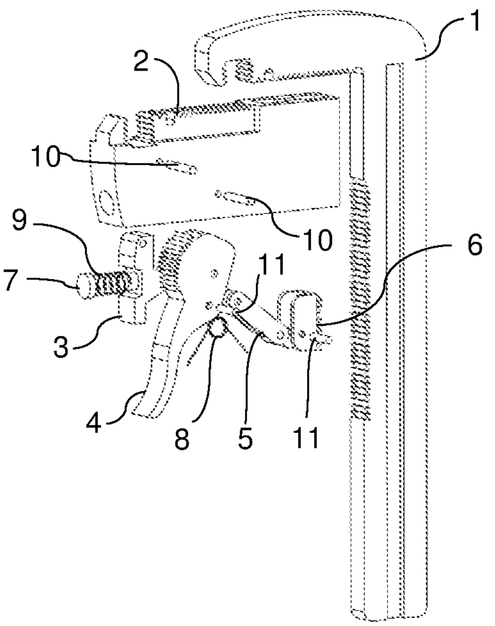
FIG. 2 is an exploded view of the plumbing wrench of FIG. 1.
Figure 3:
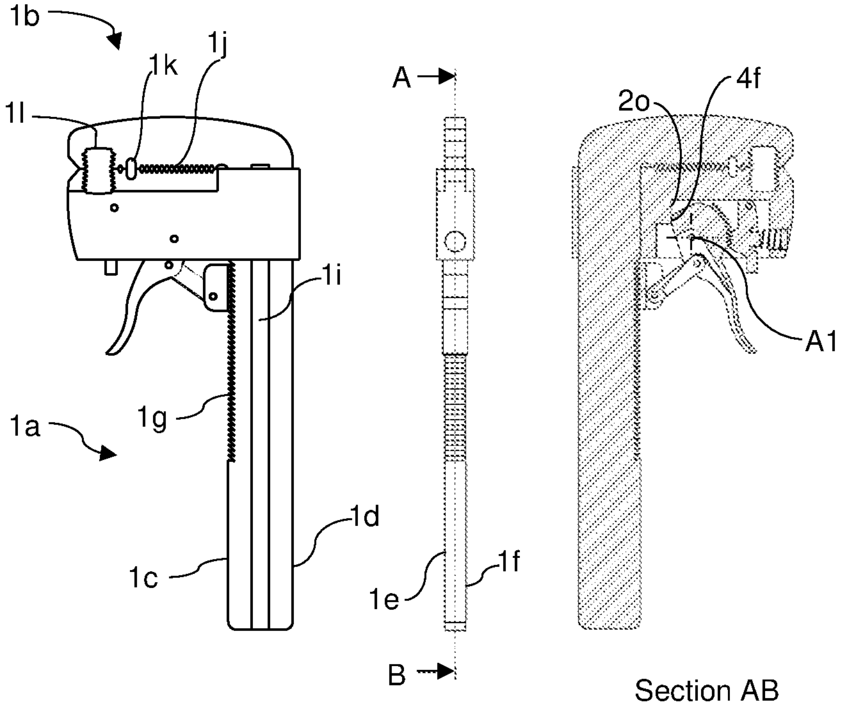
FIG. 3 is combination of orthographic and sectional views of the plumbing wrench of FIG. 1.

FIG. 2 and FIG. 3 further show how the plumbing wrench of FIG. 1 is constructed. The plumbing wrench may comprise a frame 1, a movable jaw 2, a locking pawl 3, a ratchet trigger 4, a linkage 5, a driving pawl 6, a plug 7, a plurality of elastic members 8 and 9, and a plurality of pins 10 and 11.

The frame 1 (FIG. 1, 2, 3) having a similar to a J hook body may comprise a longitudinal rail section 1*a* connected by a J hook fixed jaw section 1*b* protruding transversely from the top end of the rail section 1*a*. Two generally parallel longitudinal edges 1*c* and 1*d* define the width of the rail section 1*a*, and two generally parallel lateral edges 1*e* and 1*f* define the thickness of the frame 1. The rail section 1*a* may further comprise an integral longitudinal ratchet rack 1*g* disposed in the middle of the inner longitudinal edge 1*c*, and a pair of guiding slots 1*h* and 1*i* disposed on two lateral faces respectively between and generally parallel to the longitudinal edges 1*c* and 1*d*. The lateral edges 1*e* and 1*f*, the longitudinal edges 1*c* and 1*d*, and the surfaces of the slots 1*h* and 1*i* together form the supporting surfaces for the movable jaw. The fixed jaw section 1*b* may comprise an inward-facing gripping face 1*j* adjacent to the inner longitudinal edge 1*c* having a plurality of indentations 1*k* and 1*l* to adapt to various connector shapes as shown on FIGS. 11, 12 and 13. The rail section 1*a* functions as a rail for the movable jaw 2, a ratchet rack, as well as a handle. The pair of slots 1*h* and 1*i* function as the sliding guide and support for the movable jaw 2.

Figure 4:
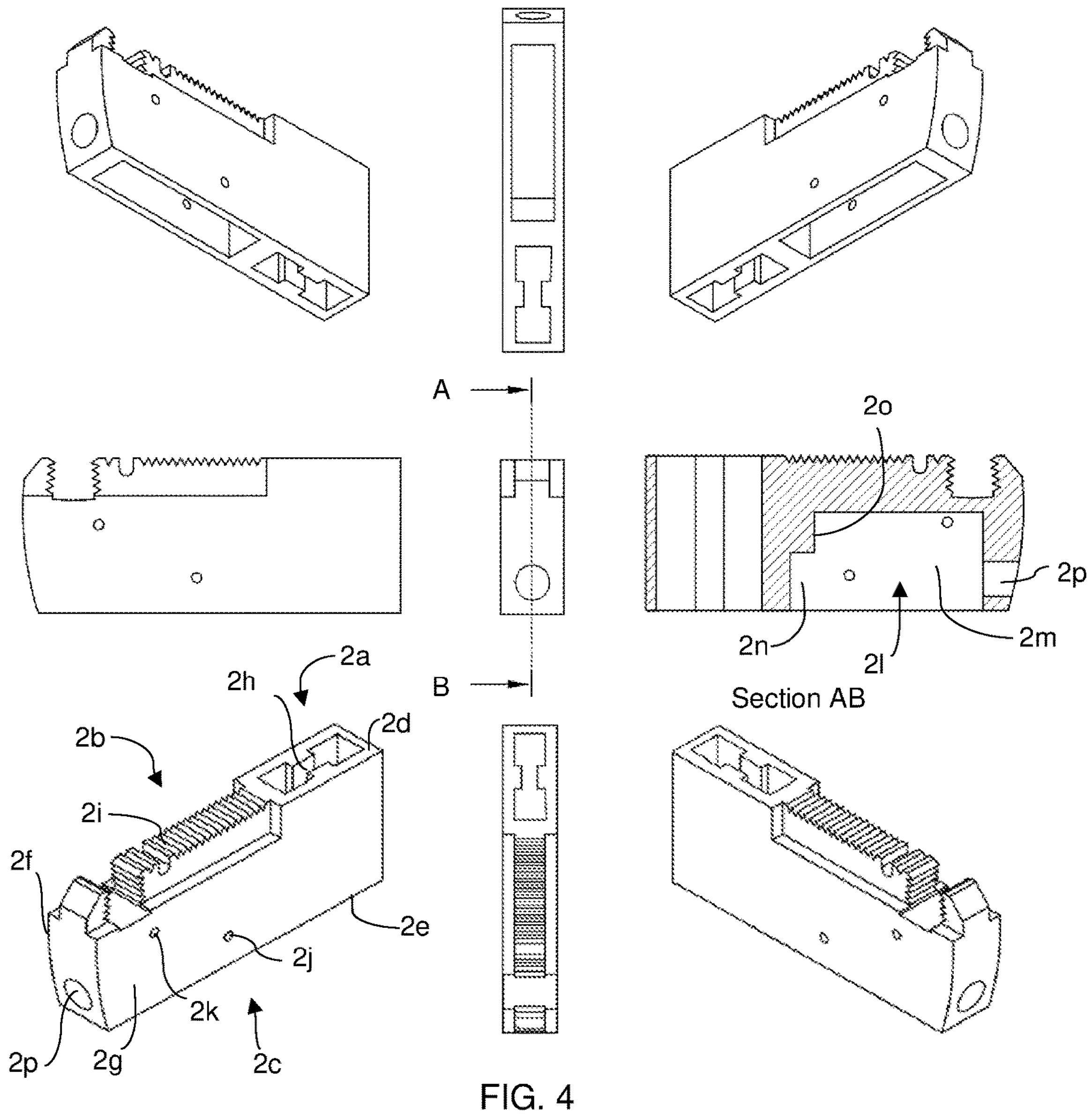
FIG. 4 is a combination of orthographic, sectional and perspective views of a movable jaw that may be used on the plumbing wrench of FIG. 1.

The movable jaw 2 (FIG. 2, FIG. 3, FIG. 4) having an elongated body may comprise a tube section 2*a* on one end, a frontal movable jaw section 2*b* back-to-back on top of a ratchet housing section 2*c* on the other end. Two generally parallel edges 2*d* and 2*e* define the height of the body, and two generally parallel lateral edges 2*f* and 2*g* define the thickness of the body. The tube section 2*a* may comprise a cutout 2*h* between two edges 2*d* and 2*e* sized and shaped to couple with and circumscribe the surfaces of the rail section 1*a*, such that the movable jaw 2 is carried by the rail section 1*a* and is freely slidable along the rail section 1*a* towards or away from the fixed jaw section 1*b*.

The movable jaw section 2*b* (FIG. 4) may comprises a frontal gripping face 2*i* sized and shaped to match the opposing gripping face 1*j* of the fixed jaw section 1*b*, such that they pair up to form a pair of jaws to clamp on a workpiece. The profiles of the gripping faces 1*j* and 2*i* are designed to adapt to and maximize the grip on different type of commercial plumbing connectors. The movable jaw section 2*b* may have a reduced lateral thickness offset from both lateral edges 2*f* and 2*g* to match the thickness of the fixed jaw section 1*b*, such that their lateral faces are generally flushed and do not interfere with the flat base of a workpiece clamped in between, such as a flange type plumbing connector as shown on FIG. 10.

The ratchet housing section 2*c* (FIG. 4) may comprise a stepped recess 2*l* from the edge 2*e*. The stepped recess 2*l* may consist of a shallow recess portion 2*n* adjacent to the tube section 2*a* to form a rotation limit face 20, a deep recess portion 2*m* to house the locking pawl 3 and the ratchet trigger 4, a first pair of hinge seats 2*j* and a second pair of hinge seats 2*k* on the lateral walls of the deep recess portion 2*m* to pivotally connect with the ratchet trigger 4 and the locking pawl 3 respectively via the pins 10. The ratchet housing section 2*c* may further comprise a horizontal circular cutout 2*p*, forming a tunnel from the deep recess 2*m* to the end of the ratchet housing section 2*c* to receive an elastic member 9 and the plug 7. The plug 7 is affixed to and blocks the outward opening of the cutout 2*p* and acts as a support for one end of the elastic member 9. The plug 7 may not be needed if the circular cutout 2*p* is formed without the outward opening at the end of the ratchet housing section 2*c*, such that one end of the elastic member 9 is directly supported by the ratchet housing section 2*c*.

Figure 9:
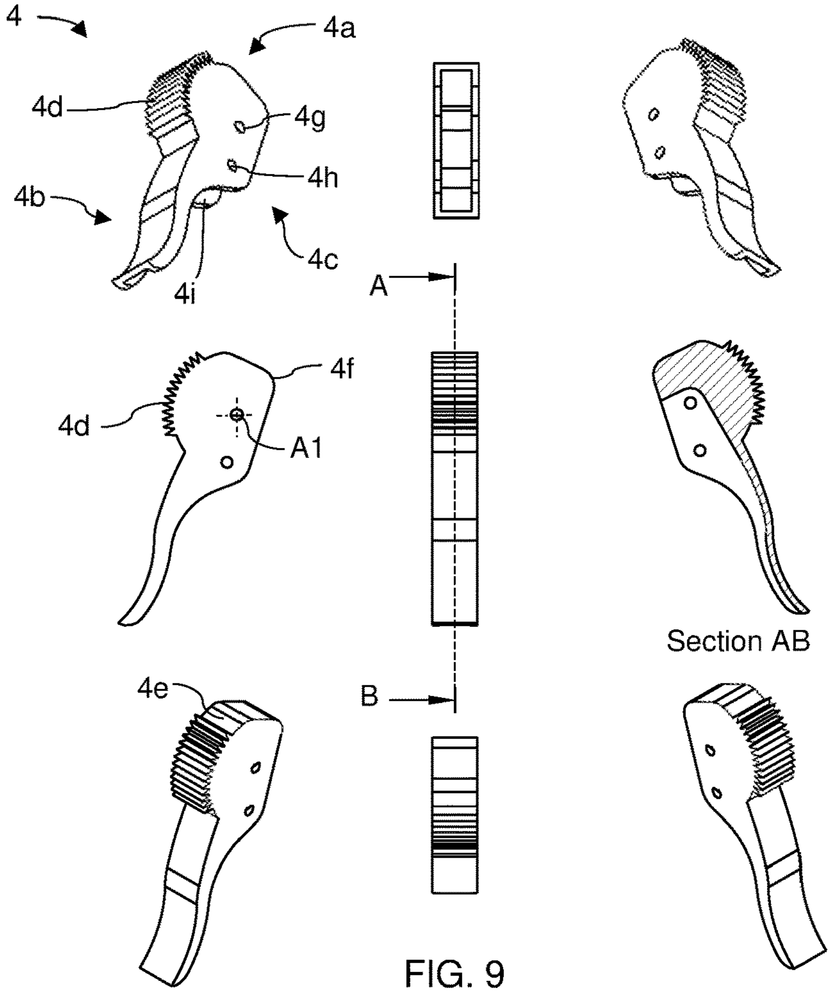
FIG. 9 is a combination of orthographic, sectional and perspective views of a ratchet trigger that may be used on the plumbing wrench of FIG. 1.

The ratchet trigger 4 (FIG. 2, FIG. 3, FIG. 9) having a similar to a trigger shape longitudinal body may comprise a transversely protruding ratchet head section 4*a*, a curvy longitudinal trigger arm section 4*b*, a pivot section 4*c* and a curvy notched slot 4*i*. The ratchet head section 4*a* may have a similar to a fan disc shape body comprising a lateral integral arc ratchet face 4*d* coaxial to the axis A1 to engage with the locking pawl 3 to form a first ratchet system, a first pair of hinge seats 4*g* centered on the axis A1 to pivotally connect with the first pair of hinge seats 2*j* of the movable jaw 2 via a pin 10 and form a first pivot, and a lateral curvature face 4*e* starting from the end of the ratchet face 4*d* to the pivot section 4*c* to form a rotation limit peak 4*f* such that an initial position of the ratchet trigger is formed when the rotation limit peak 4*f* is against the rotation limit face 20 (FIG. 3). The trigger arm section 4*b* may project from the lower end of the ratchet head 4*a*, forming a curvy lever. The notched slot 4*i* may run across the underside of the trigger arm section 4*b* and extend to the lower portion of the ratchet head 4*a*; The pivot section 4*c* may comprise a second pair of hinge seats 4*h* adjacent to the lower portion of the rachet head 4*a*, whereby to receive and pivotally connect with the linkage 5 and an elastic member 8 via the second pair of hinge seats 4*h* and a pin 11 to form a second pivot, thereof the second pivot is rotatable about the first pivot.

Figure 5:
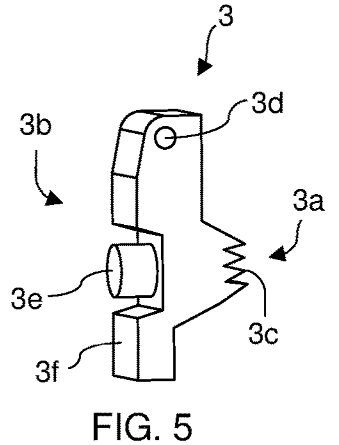
FIG. 5 is perspective view of a locking pawl that may be used on the plumbing wrench of FIG. 1.

The locking pawl 3 (FIG. 5) may comprise a lateral pawl head section 3*a* and a support section 3*b* back-to-back oriented thereof sized to be movably received into the ratchet housing section 2*c*, and a release section 3*f*. The pawl head section 3*a* may comprise a protruding pawl head having an integral pawl face 3*c* sized and shaped to engage with the ratchet face 4*d* of the ratchet trigger 4 (FIG. 3) to form the first ratchet system. The support section 3*b* may comprise a top bore hole 3*d* to pivotally connect with the second pair of hinge seats 2*k* of the movable jaw 2 via another pin 10 such that the locking pawl 3 is rotatably supported by the movable jaw, a protruding cylinder head 3*e* sized and shaped to be received into another end of the elastic member 9. The elastic member 9 provides a first elastic force to urge the engagement of the first ratchet system. The underbody release section 3*f* may be exposed to the outside of the movable jaw 2 for disengagement operation.

Figure 7:
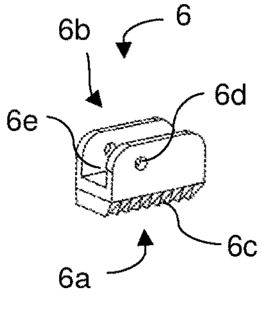
FIG. 7 is a perspective view of a driving pawl that may be used on the plumbing wrench of FIG. 1.
Figure 8:
FIG. 8 is a perspective view of a plug that may be used on the plumbing wrench of FIG. 1.

The driving pawl 6 (FIG. 7) may have a body comprising a pawl head section 6*a* and a pivot section 6*b* back-to-back oriented. The pawl section 6*a* may comprise a plurality of pawl teeth forming an integral pawl face 6*c* sized and shaped to engage with the ratchet rack 1*g* of the frame 1 and form a second ratchet system. The pivot section 6*b* may comprise a notched slot 6*e* and a pair of hinge seats 6*d* disposed closer to the lower end of the body when assembled. The arrangement of the pair of hinge seats 6*d* can be, but need not be, used to increase leverage to counter the rotating force created by the friction between the top pawl tooth and the ratchet rack 1*g* when the movable jaw 2 is slid forward.

Figure 6:
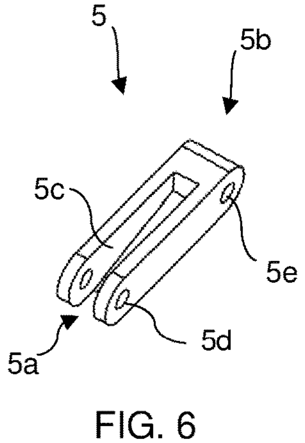
FIG. 6 is a perspective view of a linkage that may be used on the plumbing wrench of FIG. 1.

The linkage 5 (FIG. 6) may have a longitudinal body comprising a first pivoting end 5*a* having a notched slot 5*c* between a pair of hinge seats 5*d* to receive the elastic member 8 on one end, and a second pivoting end 5*b* having a bore hole 5*e* on the other end. The linkage 5 is pivotally connected to the second pair of hinge seats 4*h* of the ratchet trigger 4 and the elastic member 8 via the pair of hinge seats 5*d* and the pin 11 on the first pivoting end 5*a* to form the second pivot, and pivotally connected to the driving pawl 6 via the bore hole 5*e*, the pair of hinge seats 6*d* and another pin 11 on the second pivoting end 5*b*. Linkage 5 functions as a cascading mechanism to cascade the first ratchet system movement to the second rachet system movement thereby translating the rotation of the ratchet trigger 4 into the linear movement of the driving pawl 6. The elastic member 8 supported between the ratchet trigger 4 and the linkage 5 in effect provides a second elastic force between the frame 1 and the ratchet trigger 4 to urge the trigger arm section 4*b* to rotate away from the rail section 1*a* of the frame 1, and a third elastic force between the driving pawl 6 and the frame 1 to urge the engagement of the second ratchet system. Such effect is made possible because after being assembled the frame 1 supports all other components directly or indirectly via the assembly relationship. Therefore, the same results may be achieved by separately providing the second elastic force from one of the pluralities of elastic members supported directly or indirectly between the ratchet trigger 4 and the frame 1, and the third elastic force from another one of the plurality of elastic members supported directly or indirectly between the driving pawl 6 and the frame 1, which will be further illustrated on FIG. 20 to FIG. 24.

The first ratchet system is configured in such a way that when the trigger arm section 4*b* is rotated closer to the rail section 1*a* from the initial position, the ratchet face 4*d* pushes away the pawl face 3*c* to disengage the first ratchet system and allow the trigger arm section 4*b* to continue to be rotated forward closer to the rail section 1*a* until stopped directly or indirectly by the frame 1, forming a final position; and when the trigger arm section 4*b* stops being rotated forward, the first elastic force urges the engagement of the first ratchet system and locks the ratchet trigger 4 in a fixed position, preventing the ratchet arm section 4*b* from being rotated backward away from the rail section 1*a* by the second elastic force, thereby forming a directional self-locking mechanism. When an overcoming force is applied to the release section 3*f* to counter the first elastic force, the pawl face 3*c* is moved apart from the ratchet face 4*d* to disengage the first ratchet system, and the second elastic force urges the ratchet arm section 4*b* to rotate away from the rail section 1*a* until reaching the initial position, thereby resetting the ratchet trigger 4.

The second ratchet system is configured in such a way that when the movable jaw 2 is slid forward closer to the fix jaw section 1*b*, the ratchet rack 1g pushes away the pawl face 6*c* to disengage the second ratchet system and allow the movable jaw 2 to continue to be slid forward until stopped by a work piece or the fixed jaw section 1*b*; and when the movable jaw 2 stops being slid forward, the third elastic force urges the engagement of the second ratchet system, thereby preventing the movable jaw 2 from being slid backward and forming another directional self-locking mechanism.

Figure 10:
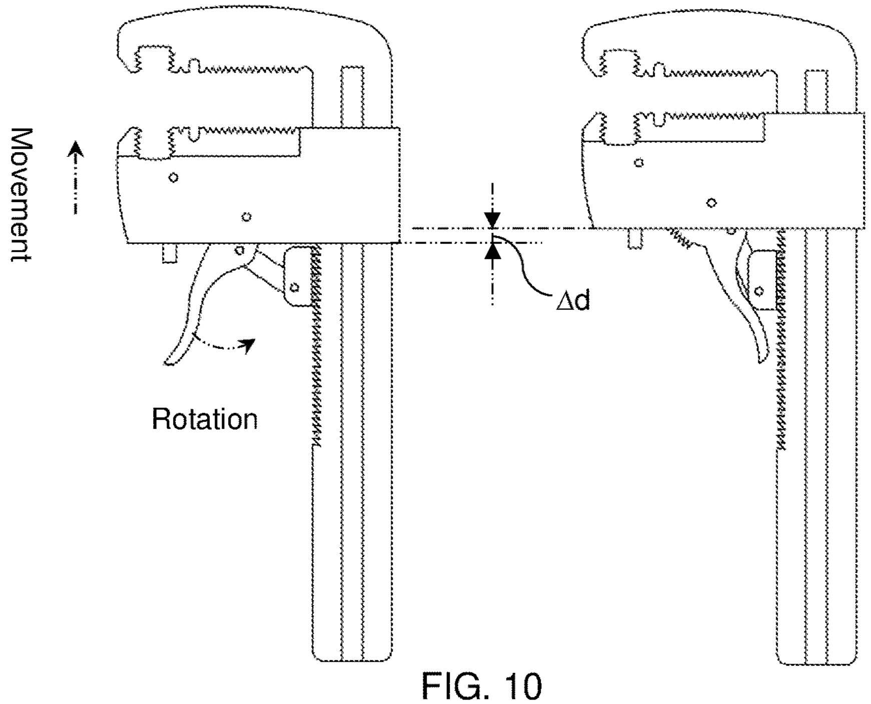
FIG. 10 is a projection view that illustrates how the cascading mechanism of the plumbing wrench of FIG. 1 translates rotation into linear movement.

FIG. 10 further shows how the cascading mechanism translate the rotation of the ratchet trigger 4 into the linear movement of the movable jaw 2. The first ratchet system may be disengaged to allow the ratchet trigger 4 to reset to the initial position and trigger arm section 4*b* to reach its maximum distance away from the rail section 1*a* while the second ratchet system is engaged. The trigger arm section 4*b* may then be rotated anti-clockwise (as indicated by the "Rotation" on FIG. 10) closer to the ratchet rack 1*g* to actuate the cascading mechanism until stopped indirectly by the frame 1 at the final position, whereby the driving pawl 6 is driven by the linkage 5 backward away from the movable jaw 2 via the rotation of the second pivot about the first pivot. When the second ratchet system is engaged, the movable jaw 2 in turn is driven forward (as indicated by the "Movement" on FIG. 10) closer to the fixed jaw section 1*b* by a distance of Δh, which defines a maximum incremental gap reduction range.

Figure 11:
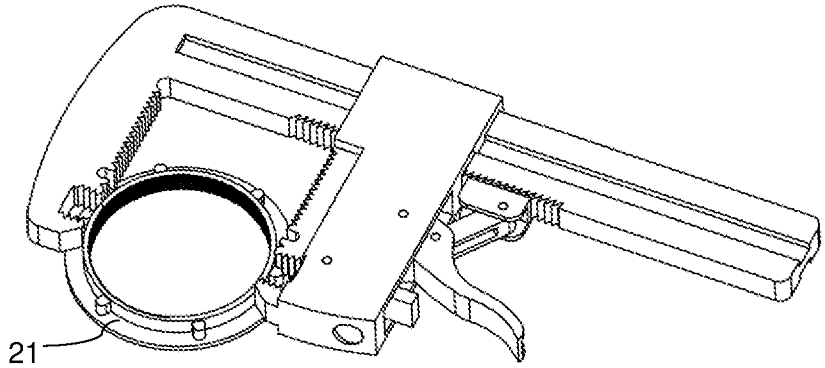
FIG. 11 is a perspective view that illustrates how the plumbing wrench of FIG. 1 can be used to operate on a commercial sink connector.
Figure 12:
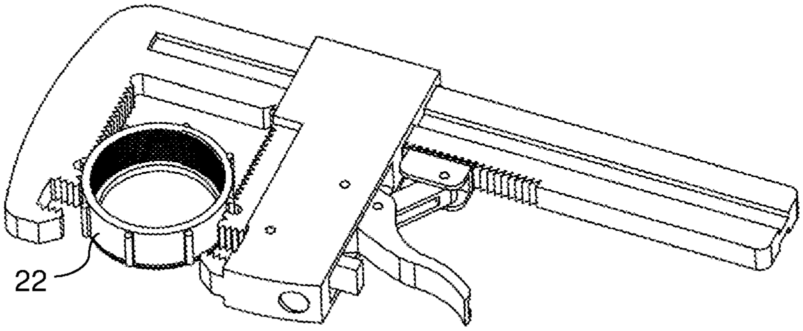
FIG. 12 is a perspective view that illustrates how the plumbing wrench of FIG. 1 can be used to operate on a commercial PVC/ABS pipe connector.
Figure 13:
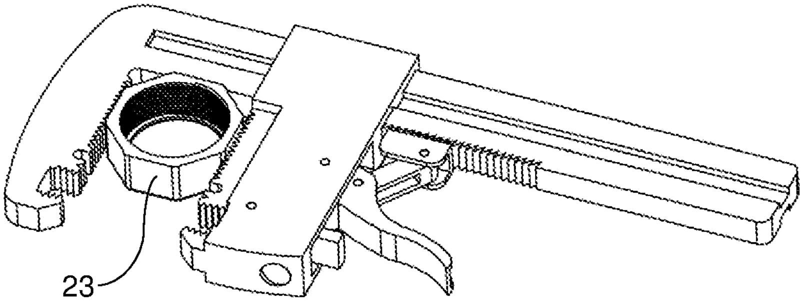
FIG. 13 is a perspective view that illustrates how the plumbing wrench of FIG. 1 can be used to operate on a commercial octagon sink connector.

FIG. 11-FIG. 13 further show how the plumbing wrench can be used to operate on a flange type sink connector 21, a PVC/ABS connector 22 and an octagon sink connector 23.

A user may use the release section 3*f* to actuate the disengagement of the first ratchet system, thereby allowing the ratchet trigger 4 to reset to the initial position. The user may then pull the driving pawl 6 away from the ratchet rack 1*g*, and slide down the movable jaw 2 to create sufficient gap between the pair of jaws. The user may then place a workpiece between the pair of jaws, and slide the movable jaw 2 forward to the fixed jaw section 1*b* until stopped by the workpiece; the third elastic force then urges the engagement of the second ratchet system and the driving pawl 6 is locked in a highest possible fixed position, while there may still be slack between the workpiece and the pair of jaws. The user may proceed to pull the trigger arm section 4*b* closer to the ratchet rack 1*g* to actuate the cascading mechanism, whereby the movable jaw 2 is driven incrementally forward until the workpiece is in firm contact with the pair of jaws. From this point on any gap reduction effort translates into slight distortions of the workpiece and all components involved, which in turn provide an increasing clamping force on the workpiece. When the trigger arm section 4*b* is released, the locking pawl 3 locks the ratchet trigger 4 in a fixed position such that the majority of the clamping force is retained via elastic deformation. The user may then turn the workpiece by the handle to tighten or loosen the workpiece, without having to keep a constant pressure on the trigger arm 4*b*.

Figure 14:
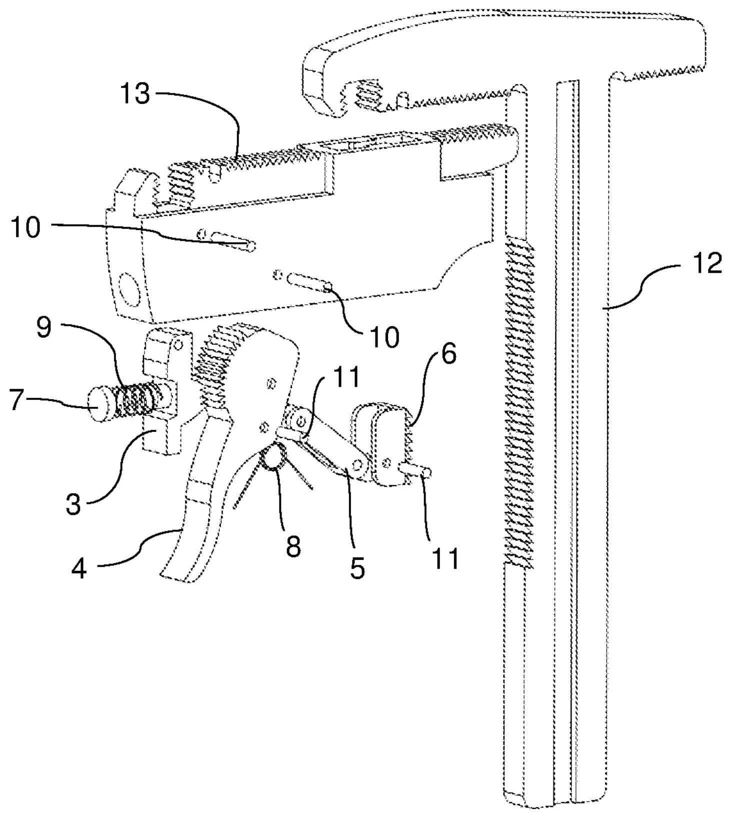
FIG. 14 is an exploded view of another preferred embodiment of the single rail clamping apparatus in the application as a plumbing wrench.
Figure 15:
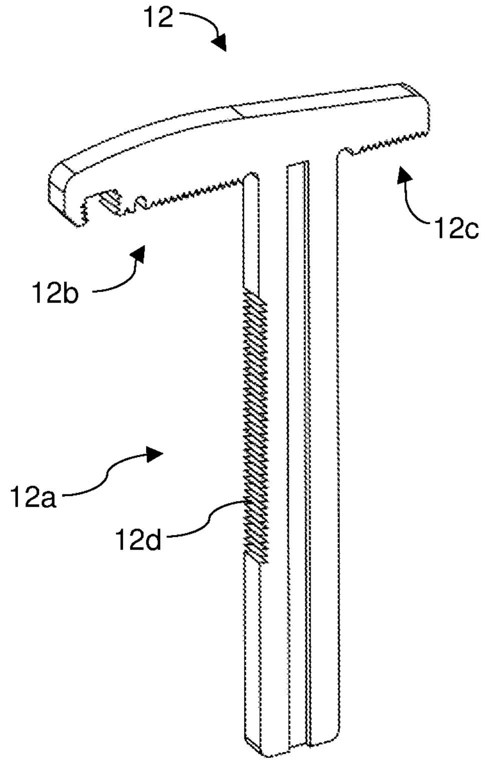
FIG. 15 is a perspective view of a frame that may be used on the plumbing wrench of FIG. 14.
Figure 16:
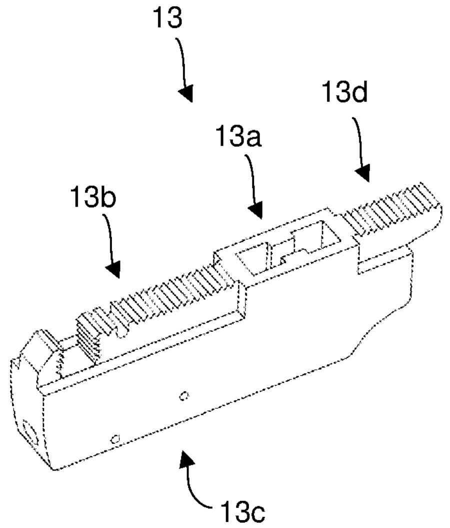
FIG. 16 is a perspective view of a movable jaw that may be used on the plumbing wrench of FIG. 14.

FIG. 14 to FIG. 16 illustrate a single rail clamping apparatus in another preferred embodiment as a plumbing wrench. In accordance to this embodiment the "J" shape frame 1 of FIG. 2 may be replaced by a "T" shape frame 12, and the movable jaw 2 of FIG. 2 may be replaced by a movable jaw 13; the other components may remain the same as the plumbing wrench of FIG. 2.

Figure 17:
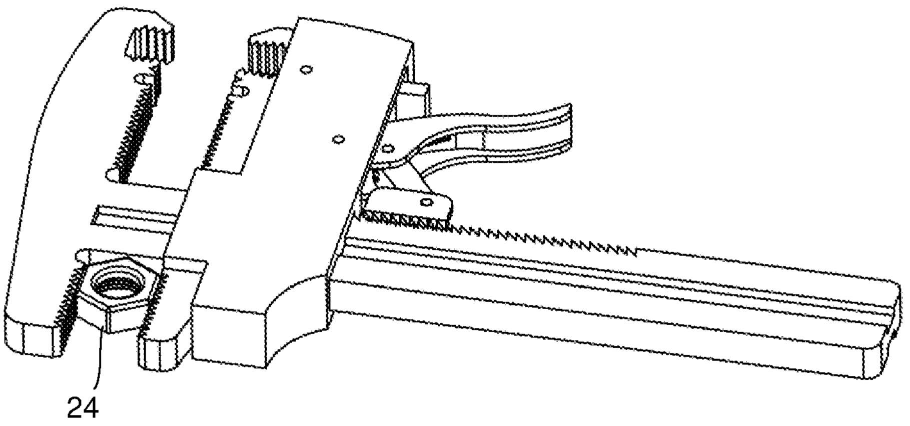
FIG. 17 is a perspective view that illustrates how the plumbing wrench of FIG. 14 can be used to operate on a commercial waterline connector.

The frame 12 (FIG. 15) may comprise a longitudinal rail section 12*a* having a longitudinal ratchet rack 12*d* disposed on a longitudinal edge of the rail section 12*a* and is integral to the longitudinal edge, a first fixed jaw section 12*b* having a first griping face and a second fixed jaw section 12*c* having a second griping face disposed on both sides of the end of the rail section 12*a* to form two transversely protruding fixed jaws. The movable jaw 13 may comprise a tube section 13*a* having identical structure as the tube section 2*a* of the movable jaw 2, a ratchet housing section 13*c* having identical structure as the ratchet housing section 2*c*, a first movable jaw section 13*b* having a first griping face and a second movable jaw section 13*d* having a second griping face disposed on both sides of the tube section 13*a*. The first and second movable jaw sections 13*b* and 13*d* are sized and shaped to pair up with and oppose to the first and second fixed jaw sections 12*b* and 12*c* respectively to form a first pair of jaws and a second pair of jaws. The second pair of jaws may have a shorter jaw length to offer increased operational stability on smaller plumbing connectors such as a waterline connector 24 shown on FIG. 17.

Figure 18:
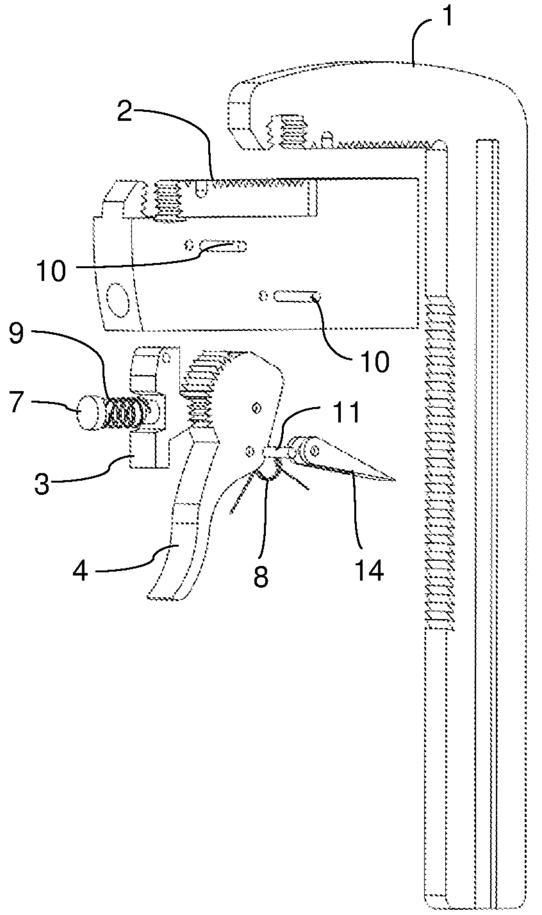
FIG. 18 is an exploded view of another preferred embodiment of the single rail clamping apparatus in the application as a plumbing wrench.
Figure 19:
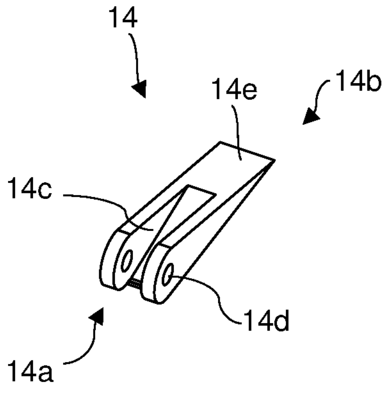
FIG. 19 is a perspective view of an integrated driving pawl linkage that may be used on the plumbing wrench of FIG. 18.

FIG. 18 to FIG. 19 illustrate a single rail clamping apparatus in yet another preferred embodiment as a plumbing wrench when the clamping force required is not significant. In accordance to this embodiment the linkage 5 and the driving pawl 6 of FIG. 2 may be replaced by a driving pawl linkage 14, and the other components may remain the same as the plumbing wrench of FIG. 2.

The driving pawl linkage 14 having a longitudinal body may comprise a pivoting end 14*a* having a slotted cutout 14*c* between a pair of hinge seats 14*d* thereof the pair of hinge seats 14*d* is pivotally connected to the second pair of hinge seats 4*h* (FIG. 9) and an elastic member 8 via a pin 11 to form a cascading mechanism, and a pawl head end 14*b* having an integral pawl tooth 14*e* sized and shaped to engage with the ratchet rack 1*g* of the frame 1 to form a second ratchet system.

FIG. 20 to FIG. 24 illustrate a single rail clamping apparatus in yet another preferred embodiment as a plumbing wrench. In accordance to this embodiment the driving pawl 6 of the plumbing wrench of FIG. 14 may be replaced by a driving pawl 51; a slider head 52, a bracket 53, an elastic member 54 and a plurality of pins 55 may be employed to enhance the operational stability of the driving pawl 51; and the other components may remain the same as the plumbing wrench of FIG. 14.

The driving pawl 51 (FIG. 21) may comprise a pawl head section 51*a* identical to the pawl head section 6*a* to engage with the ratchet rack 12*d* of the frame 12 (FIG. 15) to form a second ratchet system, and a pivot section 51*b* similar to the pivot section 6*b* back-to-back oriented. The pivot section 51*b* may further comprise a notched slot 51*d* and two pairs of hinge seats 51*e* and 51*f* disposed on both ends of the pivot section 51*b*. The slider head 52 (FIG. 23) may comprise a semi-spherical head 52*a* and a cylindrical section 52*b*. The pawl bracket 53 (FIG. 22) may comprise an outward-facing depressed thumb press section 53*a*, and a pair of generally parallel forked arms 53*b* and 53*c* forked from and bridged by the thumb press section 53*a* on one end thereby forming an opening on the other end; the pair of forked arms 53*b* and 53*c* are spaced to slidably receive the rail section 12*a* of the frame 12 in the middle section and receive the driving pawl 51 at the end of the opening having the pawl face 51*c* facing the ratchet rack 12*d*, and may further comprise two pairs of hinge seats 53*e* and 53*f* at the end of the opening spaced to align and stationarily connect with two pairs of hinge seats 51*e* and 51*f* respectively via two pins 55; the thumb press section 53*a* may further comprise an inward-facing recess 53*d* disposed in the middle between the pair of forked arms 53*b* and 53*c* to slidably receive the elastic member 54 and the cylindrical section 52*b* of the slider head 52, thereby the elastic member 54 is supported between the pawl bracket 53 and the slider head 52, and the head 52*a* is in turn slidably supported by the frame 12. A user may press down the thumb press section 53*a* to disengage the second ratchet system and slide down the movable jaw 13.

Figure 20:
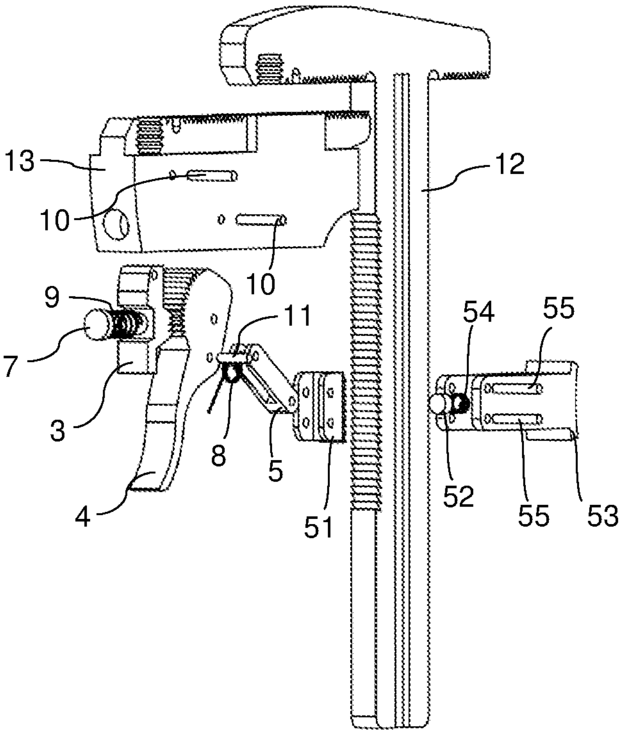
FIG. 20 is an exploded view of another preferred embodiment of the single rail clamping apparatus in the application as a plumbing wrench.
Figure 21:
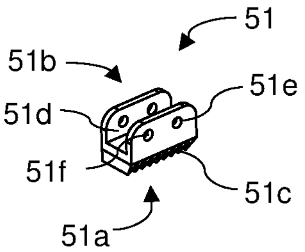
FIG. 21 is a perspective view of a driving pawl that may be used on the plumbing wrench of FIG. 20.
Figure 22:
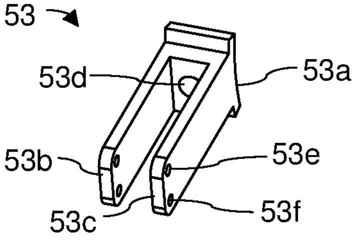
FIG. 22 is a perspective view of a pawl bracket that may be used on the plumbing wrench of FIG. 20.
Figure 23:
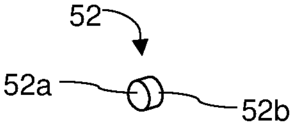
FIG. 23 is a perspective view of a slider head that may be used on the plumbing wrench of FIG. 20.
Figure 24:
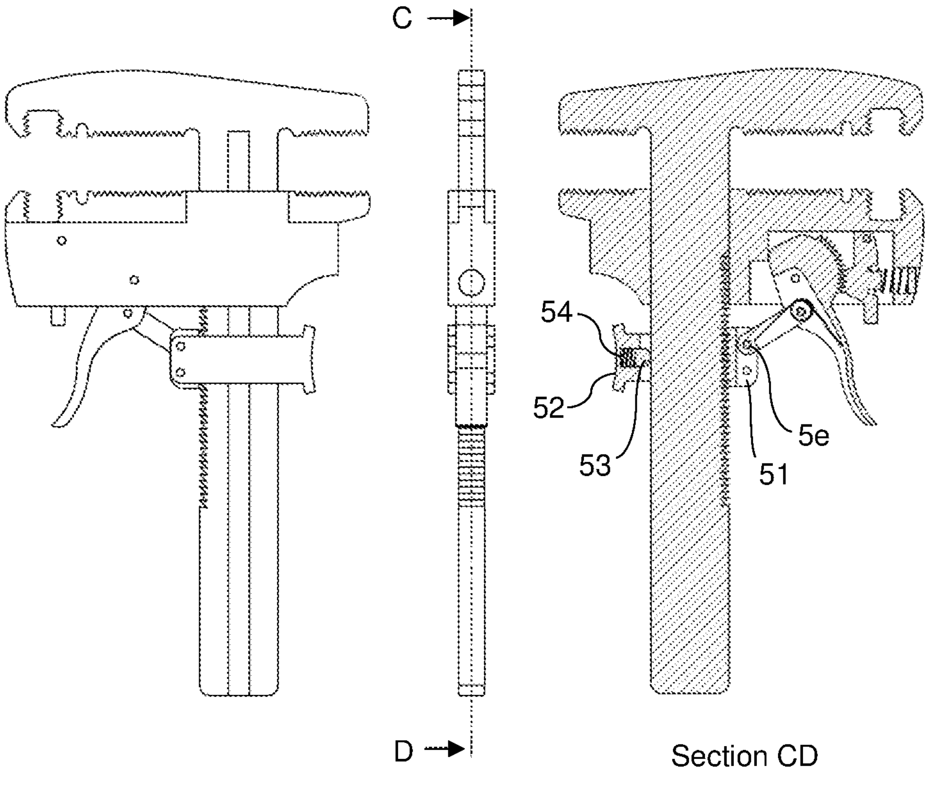
FIG. 24 is a combination of orthographic and sectional views of the plumbing wrench of FIG. 20.

The embodiment of FIG. 20 is designed to provide an additional elastic force to urge the engagement of the second ratchet system and enhance the operational stability. This embodiment also illustrates that the third elastic force to urge the engagement of the second ratchet system may be provided by an individual elastic member such as the elastic member 54 supported directly or indirectly between the driving pawl 51 and the frame 12. In other embodiments, the pawl bracket 53 may be constructed to have the pair of forked arms 53*b* and 53*c* further extended to reach the release section 3*f* of the locking pawl 3, such that when the thumb press section 53*a* is pressed down to actuate the disengagement of the second ratchet system, the locking pawl 3 is also disengaged from the ratchet trigger 4 to allow the ratchet trigger 4 reset to an initial position.

FIG. 25 to FIG. 30 illustrate a single rail clamping apparatus in a preferred embodiment as a wood clamp. In accordance to this embodiment the "J" shape frame 1 of FIG. 2 may be replaced by a mountable fixed jaw 16 and a frame 15, the movable jaw 2 of FIG. 2 may be replaced by a movable jaw 17, a fastening means consisting of a bolt 18 and a wingnut 19 may be employed to secure the fixed jaw 16 to the frame 15, and the other components may remain the same as the plumbing wrench of FIG. 2.

The frame 15 (FIG. 28) having a longitudinal body may comprise a clamping end 15*a* having a first bore hole 15*c*, a spacing end 15*b* having a second bore hole 15*d*, and a longitudinal ratchet rack 15*e* disposed in the middle on a longitudinal edge of the body and is integral to the longitudinal edge. The fixed jaw 16 (FIG. 29) having an elongated body may comprise a tube section 16*a* having a slotted cutout 16*c* sized and shaped to circumscribe and receive the frame 15 and a bore hole 16*d* through both lateral walls to receive the bolt 18 on one end, and a fixed jaw section 16*b* consisting of an overhanging arm 16*e* in the middle and a clamping head 16*f* having a frontal gripping face 16*g* on the other end. The movable jaw 17 (FIG. 30) having an elongated body may comprise a tube section 17*a* having a slotted cutout 17*d* sized and shaped to circumscribe and slidably receive the frame 15 on one end, a ratchet housing section 17*c* in the middle, and a movable jaw section 17*b* consisting of a clamping head 17*e* having a frontal gripping face 17*f* sized and shaped to pair up with and oppose to the clamping head 16*f* to form a pair of jaws on the other end. The ratchet housing section 17*c* may have identical structure as the housing section 2*c* of the movable jaw 2 (FIG. 4) to house other identical components. The first and second ratchet systems are configured to have identical configurations of the plumbing wrench of FIG. 2 when the fixed jaw 16 is mounted on the clamping end 15*a*.

When the fixed jaw 16 is mounted on the clamping end 15*a* having the griping face 16*g* facing inward lengthwise to the frame 15 and secured to the clamping end 15*a* via the aligned bore holes 15*c* and 16*d*, the bolt 18 and the wingnut 19, the clamping head 16*f* pairs up with and faces towards the clamping head 17*e*, forming a pair of clamping jaws and a clamping configuration. Whereas when the fixed jaw 16 is mounted on the spacing end 15*b* having the clamping head 16*f* facing outward lengthwise to the frame 15 and secured to the spacing end 15*b*, the clamping head 16*f* pairs up with and faces away from the clamping head 17*e* to form a pair of spacing jaws and a spacing configuration.

Figure 25:
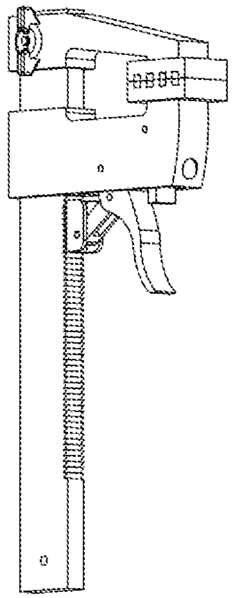
FIG. 25 is a perspective view of a preferred embodiment of a single rail clamping apparatus in the application as a wood clamp.
Figure 26:
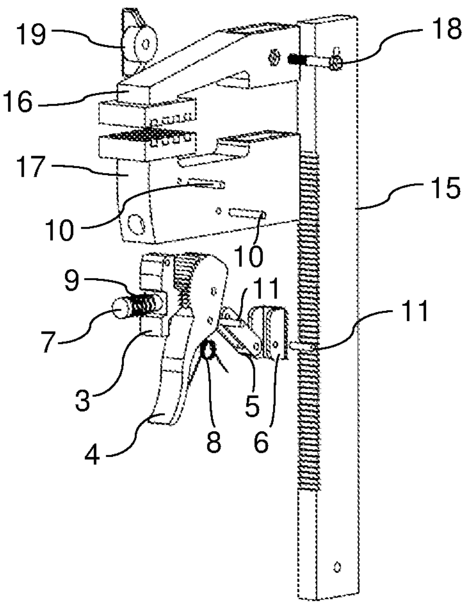
FIG. 26 is an exploded view of the wood clamp of FIG. 25.
Figure 27:
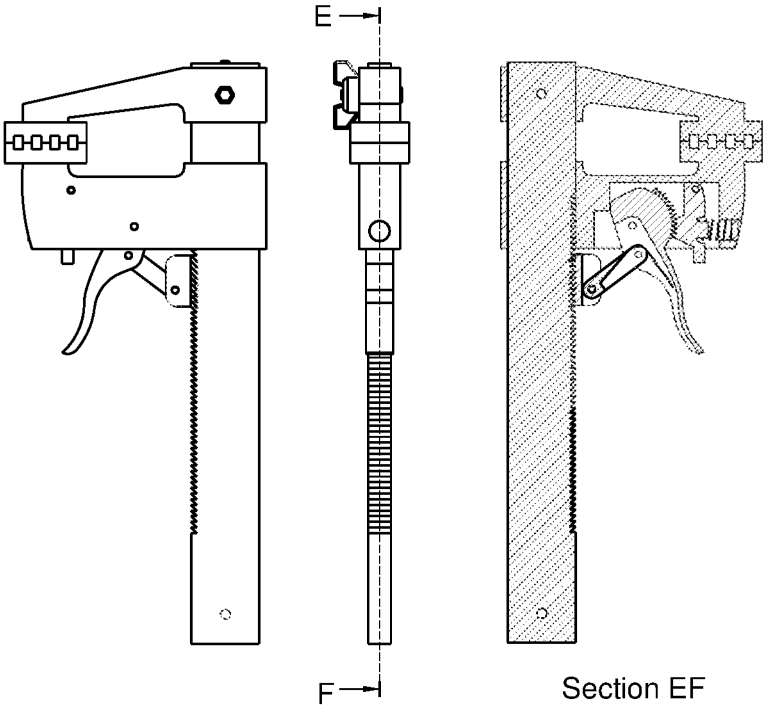
FIG. 27 is a combination of orthographic and sectional views of the wood clamp of FIG. 25.
Figure 28:
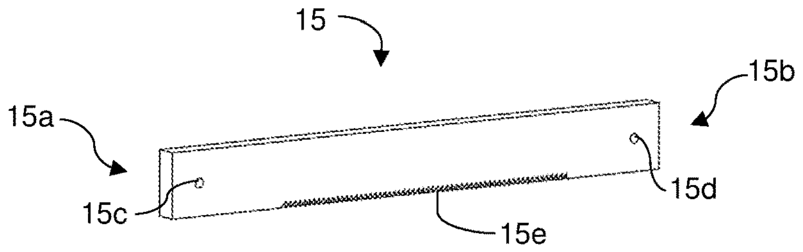
FIG. 28 is a perspective view of a frame that may be used on the wood clamp of FIG. 25.
Figure 29:
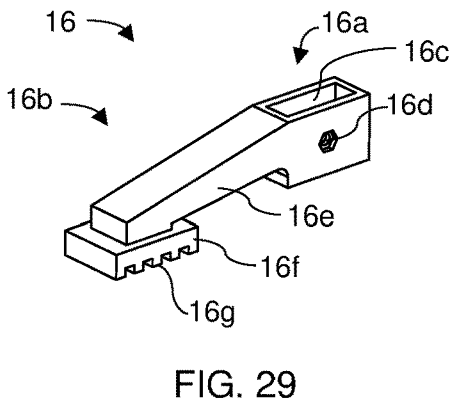
FIG. 29 is a perspective view of a fixed jaw that may be used on the wood clamp of FIG. 25.
Figure 30:
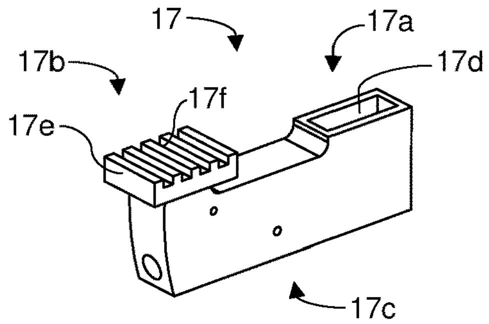
FIG. 30 is a perspective view of a movable jaw that may be used on the wood clamp of FIG. 25.
Figure 31:
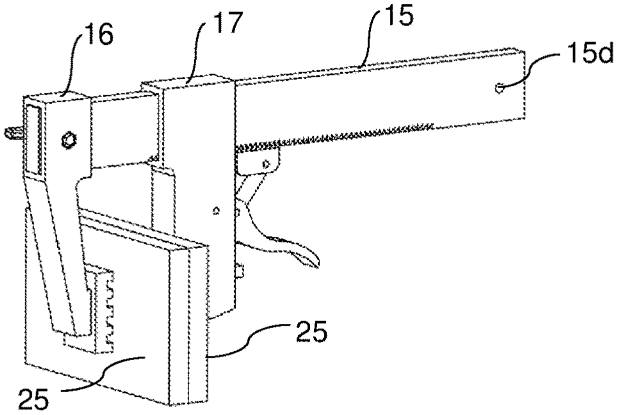
FIG. 31 is a perspective view that illustrates how the wood clamp of FIG. 25 can be used to lock two pieces of wood boards in relative fixed position.
Figure 32:
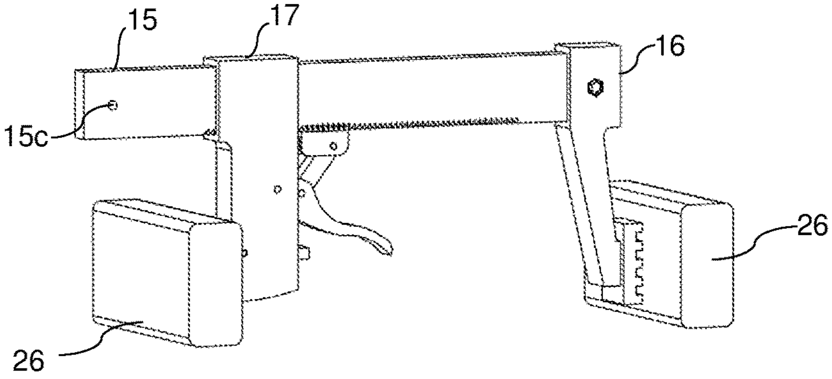
FIG. 32 is a perspective view that illustrates how the wood clamp of FIG. 25 can be used to lock and maintain the relative spacing distance between two pieces of lumber.

FIG. 31 and FIG. 32 further illustrate how the wood clamp of FIG. 25 may be used. FIG. 31 shows when the fixed jaw 16 is mounted on the frame 15 in the clamping configuration, the wood clamp may be used to clamp and fix a pair of wood boards 25 in a fixed relative position. FIG. 32 shows when the mountable fixed jaw 16 is mounted on the frame 15 in the spacing configuration, the wood clamp may be used to support and space a pair of lumbers 26 in a fixed relative position when the outward movements of the pair of lumbers 26 are limited.

Figure 33:
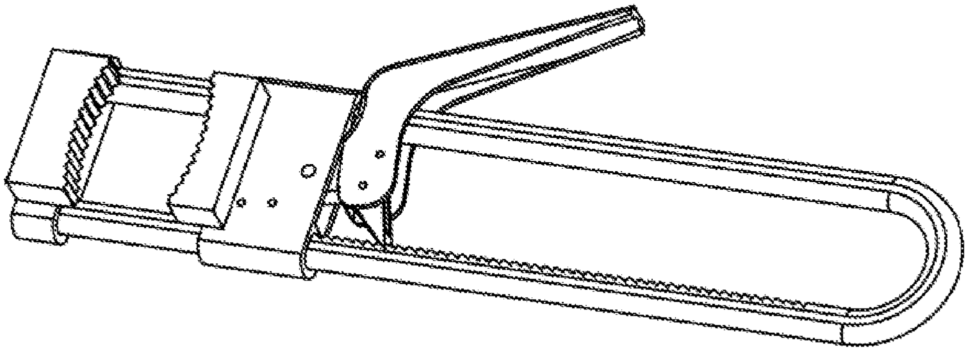
FIG. 33 is a perspective view of a preferred embodiment of a dual rail self-locking and adjustable dual ratchet clamping apparatus (referred to as a dual rail clamping apparatus hereon) in the application as a jar opener.
Figure 34:
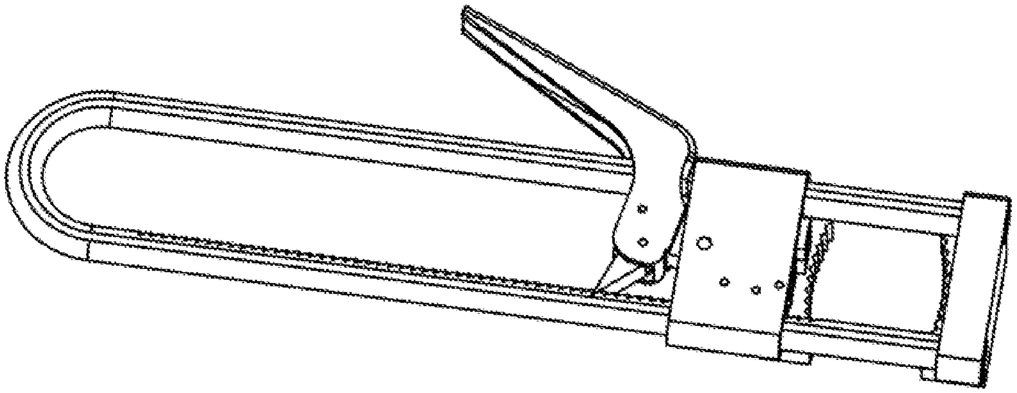
FIG. 34 is a different angle perspective view of the jar opener of FIG. 33.
Figure 35:
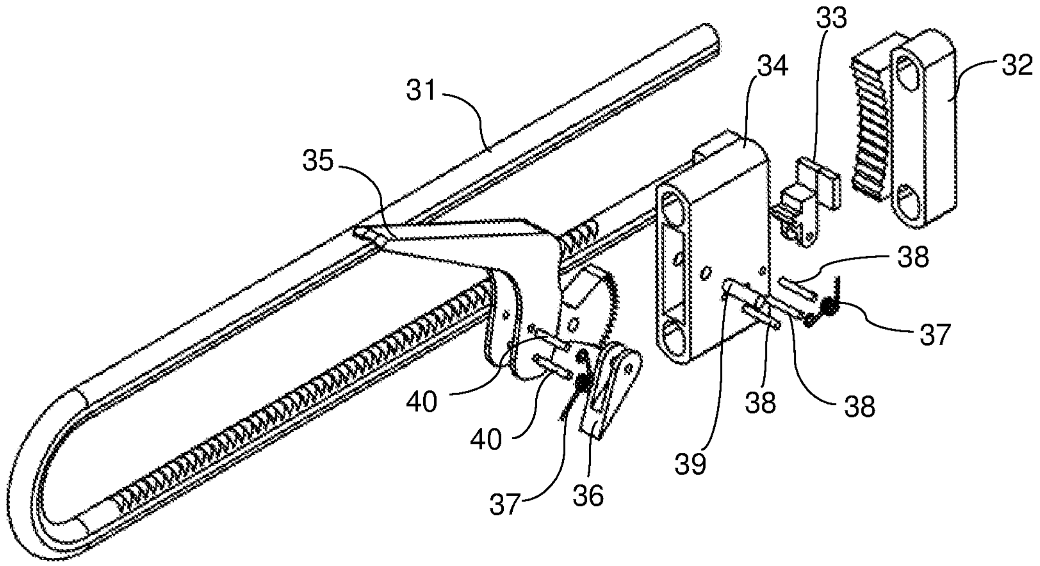
FIG. 35 is an exploded view of the jar opener of FIG. 33.
Figure 36:
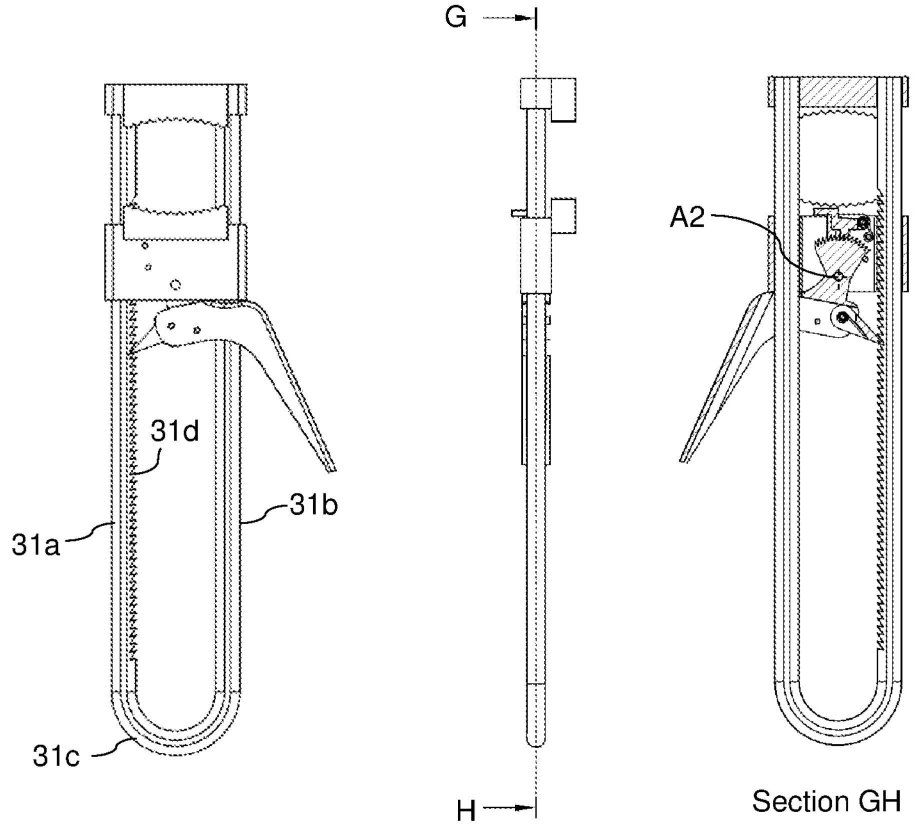
FIG. 36 is a combination of orthographic and sectional views of the jar opener of FIG. 33.
Figure 37:
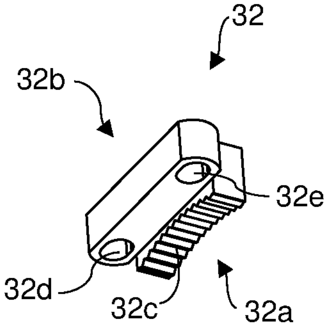
FIG. 37 is a perspective view of a fixed jaw that may be used on the jar opener of FIG. 33.
Figure 38:
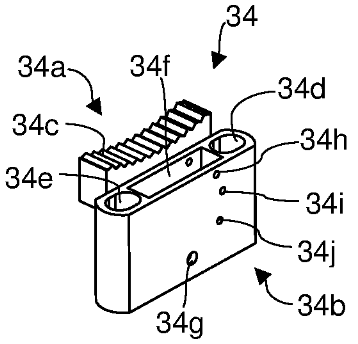
FIG. 38 is a perspective view of a movable jaw that may be used on the jar opener of FIG. 33.
Figure 39:
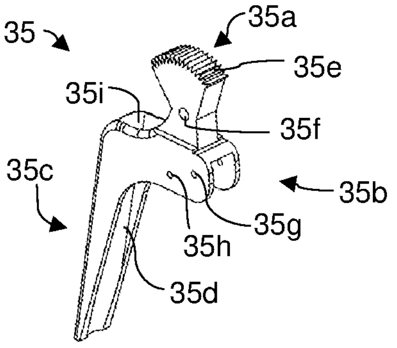
FIG. 39 is a perspective view of a ratchet trigger that may be used on the jar opener of FIG. 33.
Figure 40:
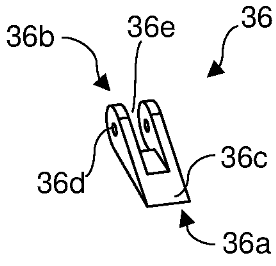
FIG. 40 is a perspective view of an integrated driving pawl linkage that may be used on the jar opener of FIG. 33.
Figure 41:
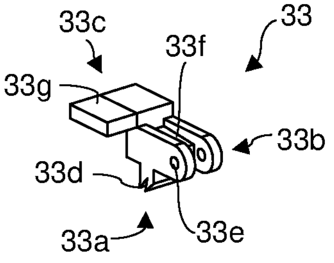
FIG. 41 is a perspective view of a locking pawl that may be used on the jar opener of FIG. 33.
Figure 42:
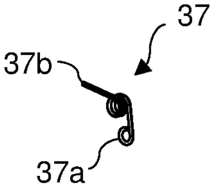
FIG. 42 is a perspective view of an elastic member that may be used on the jar opener of FIG. 33.

FIG. 33 and FIG. 34 show a dual rail clamping apparatus in a preferred embodiment as a jar opener.

FIG. 35 to FIG. 42 further show how the jar opener is constructed. The jar opener may comprise a frame 31, a fixed jaw 32, a locking pawl 33, a movable jaw 34, a ratchet trigger 35, a driving pawl linkage 36, a plurality of springs 37 having a ring end 37*a* and a straight end 37*b* (FIG. 42), a plurality of pins 38, 39 and 40.

The frame 31 (FIG. 36) having a "U" shape longitudinal body may comprise a first longitudinal rail 31*a* and a second longitudinal rail 31*b* significantly parallel to each other and bridged by a transverse bridging section 31*c* on one end, thereby leaving an open end on the other end. The first rail 31*a* may further comprise a longitudinal ratchet rack 31*d* disposed on the inward-facing longitudinal edge, and is integral to the longitudinal edge. The second rail 31*b* may have smooth surfaces for guiding and supporting the movable jaw 34. The frame 31 functions as a dual rail for the movable jaw 34, a ratchet rack, as well as a handle.

The fixed jaw 32 (FIG. 35, FIG. 36, FIG. 37) may comprise an elongated fixed jaw section 32*a* and an elongated support section 32*b* disposed side by side; the fixed jaw section 32*a* may further comprise a curved toothed griping face 32*c*; the support section 32*b* may further comprise a pair of tube sections 32*d* and 32*e* spaced, sized and shaped to receive the first and second rails 31*a* and 31*b* disposed distally on both ends; the fixed jaw 32 receives and is affixed to the frame 31 at the open end having the griping face 32*c* face inwards to support the frame 31.

The movable jaw 34 (FIG. 35, FIG. 36 FIG. 38) may comprise an elongated movable jaw section 34*a* and an elongated support section 34*b* disposed side by side; the movable jaw section 34*a* may further comprise a curved toothed gripping face 34*c* to pair up with and oppose to the griping face 32*c* to form a pair of jaws; the support section 34*b* may further comprise a pair of tube sections 34*d* and 34*e* spaced, sized and shaped to slidably receive the first and second rails 31*a* and 31*b* disposed distally on both ends, connected by a ratchet housing section 34*f* consisting of a slotted cutout generally parallel to the pair of tube sections 34*d* and 34*e* in the middle; the ratchet housing section 34*f* may further comprise a first pair of hinge seats 34*g* disposed centrally along the bottom edge through both lateral walls to pivotally connect with the ratchet trigger 35 via a pin 39 and form a first pivot, a second pair of hinge seats 34*h* disposed along the top edge through both lateral walls positioned accordingly to pivotally connect with the locking pawl 33 and an elastic member 37 via a first pin 38, a first bore hole 34*i* through both lateral walls disposed accordingly to coaxially connect with the ring end 37*a* of the elastic member 37 via a second pin 38 to fix the ring end of the elastic member 37, and a second bore hole 34*j* through both lateral walls disposed accordingly to stationarily receive a third pin 38 to form a rotation limit and an initial position for the ratchet trigger 35.

The ratchet trigger 35 (FIG. 35, FIG. 36, FIG. 39) having a curvy longitudinal body may comprise a frontal ratchet head 35*a* on one end, a pivot section 35*b* in the middle, a trigger arm section 35*c* on the other end and a "L" shape notched slot 35*d* running across the underbody of the trigger arm section 35*c* and extending through the pivot section 35*b*; the ratchet head 35*a* having a fan disc shape body may further comprise a frontal arc ratchet face 35*e* coaxial to an axial center bore 35*f* centered on the axis A2, and is sized to be rotatably received into the ratchet housing section 34*f*; the pivot section 35*b* may further comprise a pair of hinge seats 35*g* positioned and sized accordingly to pivotally connect with the driving pawl linkage 36 and another elastic member 37 via a pin 40 to form a second pivot on one end, and a bore hole 35*h* through both walls of the notched slot 35*d* in the middle positioned and sized accordingly to coaxially connect with the ring end 37*a* of the other elastic member 37 via another pin 40; the trigger arm section 35*c* may comprise an opening 35*i* at the corner of where the trigger arm section 35*c* meets the pivot section 35*b* sized and shaped to slidably receive the second rail 31*b* and also allow the trigger arm section 35*c* to swing away or closer to the second rail 31*b* about the axis A2.

The locking pawl 33 (FIG. 41) may comprise a release section 33*c* on one end, a pawl head section 33*a* and a support section 33*b* back-to-back oriented on the other end; the pawl head section 33*a* is sized to be rotatably received into the ratchet housing section 34*f* and may comprise an integral pawl face 33*d* sized and shaped to engage with the ratchet face 35*e* to form a first ratchet system; the support section 33*b* may further comprise a pair of hinge seats 33*e* at the end of a notched slot 33*f* to pivotally connected with the pair of hinge seats 34*h* of the movable jaw 34 and the elastic member 37 via the first pin 38, and support the straight end 37*b* of the elastic member 37 in the notched slot 33*f*, thereby providing a first elastic force between the movable jaw 34 and the locking pawl 33; the release section 33*c* may consist of a flat tab 33*g* sized and shaped to cover the top side and overhangs to one side of the ratchet housing section 34*f* to expose part of the flat tab 33*g* when assembled, such that a user may flip up the release section 33*c* to disengage the first ratchet system.

The driving pawl linkage 36 having a longitudinal body may comprise a pawl head end 36*a* having an integral pawl tooth 36*c* sized and shaped to engage with the ratchet rack 31*d* to form a second ratchet system, and a pivoting end 36*b* consisting of a pair of hinge seats 36*d* on both walls of a notched slot 36*e* to pivotally connect with the pair of hinge seats 35*g* and the other elastic member 37 via another pin 40 to form the second pivot; whereas the notched slot 36*e* supports the straight end 37*b* of the other elastic member 37, providing a second elastic force to urge the trigger arm section 35*c* to rotate outwards away from the second rail 31*b* and a third elastic force to urge the engagement of the driving pawl linkage 36 and the ratchet rack 31*d*. The driving pawl linkage 36 functions as a cascading mechanism between the first and second ratchet systems to translate the rotation of the ratchet trigger 35 into the linear movement of the movable jaw 34 relative to the fixed jaw 32 when the second ratchet system is engaged.

The first ratchet system is configured in such a way that when the trigger arm section 35*c* is rotated closer to the second rail 31*b* from the initial position, the ratchet face 35*e* pushes away the pawl face 33*d* to disengage the first ratchet system and allow the trigger arm section 35*c* to continue to be rotated forward closer to the second rail 31*b* until stopped by the frame 31, forming a final position; and when the trigger arm section 35*c* stops being rotated forward, the first elastic force urges the engagement of the first ratchet system and locks the ratchet trigger 35 in a fixed position, preventing the ratchet arm section 35*c* from being rotated outwards away from the second rail 31*b* by the second elastic force, thereby forming a directional self-locking mechanism. When an overcoming force is applied to the release section 33*c* to counter the first elastic force, the pawl face 33*d* is rotated apart from the ratchet face 35*e* to disengage the first ratchet system, and the second elastic force urges the ratchet arm section 35*c* to rotate away from the second rail 31*b* until reaching the initial position, thereby resetting the ratchet trigger 35.

The second ratchet system is configured in such a way that when the movable jaw 34 is slid forward closer to the fix jaw 32, the ratchet rack 31*d* pushes away the pawl tooth 36*c* to disengage the second ratchet system and allow the movable jaw 34 to continue to be slid forward until stopped by a workpiece or the fixed jaw 32; and when the movable jaw 34 stops being slid forward, the third elastic force urges the engagement of the second ratchet system, thereby preventing the movable jaw 34 from being slid backward and forming another directional self-locking mechanism.

Figure 43:
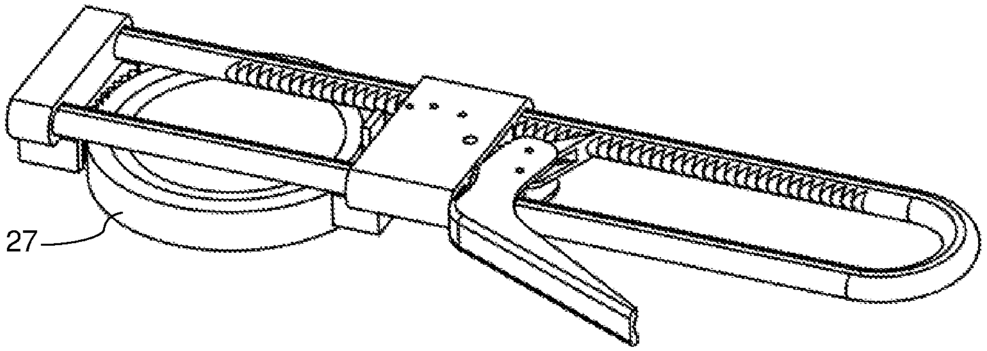
FIG. 43 is a perspective view that illustrates how the jar opener of FIG. 33 can be used to operate on a jar lid.

FIG. 43 further shows how the jar opener can be used to operate on a jar lid 27.

A user may use the release section 33*c* of the locking pawl 33 to disengage the first ratchet system and allow the second elastic force to reset the ratchet trigger 35 to the initial position. The user may then rotate the driving pawl linkage 36 away from the ratchet rack 31*d* to disengage the second ratchet system and slide down the movable jaw 34 to create sufficient gap between the pair of jaws. The user may then place the jar lid 27 between the fixed jaw 32 and the movable jaw 34, and slide the movable jaw 34 forward until stopped by the jar lid 27 such that the driving pawl linkage 36 is engaged in a highest possible fixed position while there may still be slack between the jar lid 27 and the pair of jaws. The user may then actuate the cascading mechanism by pulling the trigger arm section 35*c* forward to the second rail 31*b* to incrementally reduce the gap between the pair of jaws until the jar lid 27 is firmly in contact with the pair of jaws. From this point on any further gap reduction effort translates into an increasing clamping force on the jar lid 27. When the trigger arm section 35*c* is released, the locking pawl 33 self-locks the ratchet trigger 35 in a fixed position, such that the majority of the clamping force is retained via elastic deformation of all components involved. The user then may then turn the jar lid 27 by the frame 31, without having to keep constant pressure on the trigger arm section 35*c*.

I claim:

1. A single rail self-locking and adjustable clamping apparatus comprising:

- a frame having a longitudinal body comprising a rail and a fixed jaw end, the frame further comprising a ratchet rack extending along a longitudinal portion of the rail;
- a movable jaw supported by the frame and configured to be slidable along the rail toward and away from the fixed jaw end;
- a first ratchet system comprising:
  - a user-operable lever mounted on the movable jaw and rotatable about a first pivot axis;
  - a ratchet cam coupled to the lever;
  - a locking pawl supported on the movable jaw and biased by a first elastic member into engagement with the ratchet cam;
  - wherein the first ratchet system permits rotation of the lever in a first rotational direction and resists rotation in an opposite rotational direction to provide rotational self-locking of the lever;

a second ratchet system comprising:

a driving pawl configured to engage the ratchet rack of the frame; and a second elastic member biasing the driving pawl into engagement with the ratchet rack;

wherein the second ratchet system permits movement of the driving pawl along the rail in a forward direction toward the fixed jaw end and resists movement in an opposite direction to provide linear self-locking;

a linkage system operatively coupling the first ratchet system to the driving pawl;

wherein rotational movement of the lever is transmitted through the linkage system to drive incremental linear advancement of the driving pawl along the ratchet rack while the second ratchet system is engaged;

wherein incremental advancement of the driving pawl advances the movable jaw along the rail toward the fixed jaw end to apply a clamping force; and wherein, when user actuation of the lever is released, the first and second ratchet systems cooperate to retain the clamping force and prevent reverse movement of the movable jaw.

2. The clamping apparatus of claim 1, wherein the linkage system comprises a linkage member having a first end pivotally connected to the first ratchet system and a second end pivotally connected to the driving pawl, such that rotation of the lever drives the linkage member to advance the driving pawl along the ratchet rack.

3. The clamping apparatus of claim 1, wherein the linkage system and the driving pawl system are integrated into a single driving pawl linkage member having a pivot end coupled to the first ratchet system and a pawl end configured to engage the ratchet rack.

4. A single rail self-locking and adjustable clamping apparatus comprising:

a frame having a longitudinal body comprising a rail, a first end and a second end, the frame further comprising a ratchet rack extending along a longitudinal portion of the rail;

a fixed jaw configured to be selectively mounted at either the first end or the second end of the frame, the fixed jaw having a first gripping surface;

a movable jaw supported by the frame and configured to be slidable along the rail toward and away from the fixed jaw, the movable jaw having a second gripping surface arranged to oppose the first gripping surface;

a first ratchet system supported on the movable jaw and comprising:

a user-operable lever rotatable about a first pivot axis;

a ratchet cam coupled to the lever;

a locking pawl biased by a first elastic member into engagement with the ratchet cam;

wherein the first ratchet system permits rotation of the lever in a first rotational direction and resists rotation in an opposite rotational direction to provide rotational self-locking;

a second ratchet system comprising:

a driving pawl configured to engage the ratchet rack of the frame; and a second elastic member biasing the driving pawl into engagement with the ratchet rack;

wherein the second ratchet system permits movement of the driving pawl along the rail in a forward direction and resists movement in an opposite direction to provide linear self-locking;

a linkage system operatively coupling the first ratchet system to the driving pawl;

wherein rotation of the lever is transmitted through the linkage system to drive incremental linear advancement of the driving pawl along the ratchet rack while the second ratchet system is engaged, thereby advancing the movable jaw along the rail relative to the fixed jaw;

wherein, when the fixed jaw is mounted at the first end of the frame, incremental advancement of the movable jaw reduces a distance between the first and second gripping surfaces to apply a clamping force;

wherein, when the fixed jaw is mounted at the second end of the frame, incremental advancement of the movable jaw increases a distance between the first and second gripping surfaces to apply a spacing force; and wherein, when user actuation of the lever is released, the first and second ratchet systems cooperate to retain the clamping force or the spacing force and prevent reverse movement of the movable jaw.

5. The clamping apparatus of claim 4, wherein the linkage system comprises a linkage member having a first end pivotally connected to the first ratchet system and a second end pivotally connected to the driving pawl, such that rotation of the lever drives the linkage member to advance the driving pawl along the ratchet rack.

6. The clamping apparatus of claim 4, wherein the linkage system and the driving pawl are integrated into a single driving pawl linkage member having a pivot end coupled to the first ratchet system and a pawl end configured to engage the ratchet rack.

7. A dual rail self-locking and adjustable clamping apparatus comprising:

a frame having a generally U shape longitudinal body comprising a first rail, a second rail spaced from and substantially parallel to the first rail, and a bridging section connecting the first and second rails at one end, the first rail comprising a ratchet rack extending along a longitudinal portion thereof;

a fixed jaw spanning between the first and second rails and fixed relative to the frame, the fixed jaw having a first gripping surface;

a movable jaw spanning between the first and second rails and configured to be slidable along the frame toward and away from the fixed jaw, the movable jaw having a second gripping surface arranged to oppose the first gripping surface;

a first ratchet system supported on the movable jaw and comprising:

a user-operable lever rotatable about a first pivot axis;

a ratchet cam coupled to the lever;

a locking pawl biased by a first elastic member into engagement with the ratchet cam;

wherein the first ratchet system permits rotation of the lever in a first rotational direction and resists rotation in an opposite rotational direction to provide rotational self-locking;

a second ratchet system comprising:

a driving pawl configured to engage the ratchet rack on the first rail; and a second elastic member biasing the driving pawl into engagement with the ratchet rack;

wherein the second ratchet system permits movement of the driving pawl along the first rail in a forward direction toward the fixed jaw and resists movement in an opposite direction to provide linear self-locking;

a linkage system operatively coupling the first ratchet system to the driving pawl;

wherein rotation of the lever is transmitted through the linkage system to drive incremental linear advancement of the driving pawl along the ratchet rack while the second ratchet system is engaged, thereby advancing the movable jaw toward the fixed jaw along the dual-rail frame;

wherein incremental advancement of the movable jaw reduces a distance between the first and second gripping surfaces to apply a clamping force to a workpiece; and wherein, when user actuation of the lever is released, the first and second ratchet systems cooperate to retain the clamping force and prevent reverse movement of the movable jaw along the frame.

8. The clamping apparatus of claim 7, wherein the linkage system comprises a linkage member having a first end pivotally connected to the first ratchet system and a second end pivotally connected to the driving pawl, such that rotation of the lever drives the linkage member to advance the driving pawl along the ratchet rack of the first rail.

9. The clamping apparatus of claim 7, wherein the linkage system and the driving pawl are integrated into a single driving pawl linkage member having a pivot end coupled to the first ratchet system and a pawl end configured to engage the ratchet rack on the first rail.

* * * * *